(12) United States Patent
Dussol et al.

(10) Patent No.: US 8,382,031 B2
(45) Date of Patent: *Feb. 26, 2013

(54) FAN COWL SUPPORT CRADLE MOUNTED ON THE ATTACHMENT PYLON AND ON THE AIR INLET OF THE NACELLE

(75) Inventors: Loic Dussol, Toulouse (FR); Frederic Ridray, L'Isle Jourdain (FR)

(73) Assignee: Airbus Operations, Toulouse (FR)

( * ) Notice: Subject to any disclaimer, the term of this patent is extended or adjusted under 35 U.S.C. 154(b) by 251 days.

This patent is subject to a terminal disclaimer.

(21) Appl. No.: 12/674,796

(22) PCT Filed: Aug. 22, 2008

(86) PCT No.: PCT/EP2008/061015
§ 371 (c)(1),
(2), (4) Date: Jul. 15, 2010

(87) PCT Pub. No.: WO2009/027336
PCT Pub. Date: Mar. 5, 2009

(65) Prior Publication Data
US 2011/0127369 A1 Jun. 2, 2011

(30) Foreign Application Priority Data
Aug. 27, 2007 (FR) ...................................... 07 57189

(51) Int. Cl.
*B64D 27/16* (2006.01)
(52) U.S. Cl. ........................................ 244/54; 60/226.2

(58) Field of Classification Search ................. 244/53 R, 244/54; 60/226.2; 248/554
See application file for complete search history.

(56) References Cited

U.S. PATENT DOCUMENTS

| 4,458,863 | A | 7/1984 | Smith | |
|---|---|---|---|---|
| 5,157,915 | A | 10/1992 | Bart | |
| 6,227,485 | B1 * | 5/2001 | Porte | 244/54 |
| 8,162,254 | B2 * | 4/2012 | Roche | 244/54 |
| 2004/0227033 | A1 * | 11/2004 | Picard et al. | 244/54 |
| 2005/0116093 | A1 * | 6/2005 | Machado et al. | 244/54 |
| 2009/0266932 | A1 * | 10/2009 | Roche et al. | 244/54 |

FOREIGN PATENT DOCUMENTS

| EP | 0 453 360 | 10/1991 |
|---|---|---|
| FR | 2 891 526 | 4/2007 |
| FR | 2 903 665 | 1/2008 |
| WO | WO2008006823 A1 * | 1/2008 |
| WO | WO2008006826 A1 * | 1/2008 |

* cited by examiner

*Primary Examiner* — Timothy D Collins
*Assistant Examiner* — Jamie S Stehle
(74) *Attorney, Agent, or Firm* — Oblon, Spivak, McClelland, Maier & Neustadt, L.L.P.

(57) ABSTRACT

An engine unit for an aircraft including an engine, a device for hooking the engine, and a nacelle surrounding the engine and provided with fan cowls, the device for hooking including a rigid structure and a front aerodynamic structure whereon the fan cowls are articulated, the front aerodynamic structure including a cradle with a rear mechanism of hooking mounted on the rigid structure. The cradle also includes a front mechanism of hooking mounted on an air inlet of the nacelle.

14 Claims, 7 Drawing Sheets

FAN COWL SUPPORT CRADLE MOUNTED ON THE ATTACHMENT PYLON AND ON THE AIR INLET OF THE NACELLE

TECHNICAL FIELD

This invention in general relates to an engine unit for aircraft comprising an engine, a device for hooking the engine as well as a nacelle surrounding the engine and provided with fan cowls as well as an air inlet, the aforementioned device for hooking comprising a rigid structure as well as a front aerodynamic structure whereon the fan cowls are articulated.

This type of device for hooking, also called an attachment pylon or "EMS" ("Engine Mounting Structure"), globally makes it possible to suspend an engine such as a engine below the wing of the aircraft, or to mount this engine above this same wing, or to assemble this engine on a rear portion of the fuselage of the aircraft.

PRIOR ART

Such a device for hooking is indeed provided to comprise the connection interface between an engine and a wing of the aircraft. It makes it possible to transmit to the structure of this aircraft the loads generated by its associated engine, and also allows for the routing of the fuel, electrical and hydraulic systems, and air between the engine and the aircraft.

In order to ensure the transmission of loads, the device for hooking comprises a rigid structure also called primary structure, often of the "caisson" type, i.e. formed by the assembling of upper and lower spars and of lateral panels connected together by the intermediary of transversal ribs.

On the other hand, the device for hooking is provided with means of hooking interposed between the engine and the rigid structure, these means comprising globally two engine fasteners, as well as a device for absorbing thrust loads generated by the engine. In prior art, this device for absorbing normally comprises two lateral link rods connected on the one hand to a case of the engine such as the fan case or the intermediary case, and on the other hand to a rear engine fastener fixed on the central case or the ejection case of the latter.

In the same way, the device for hooking further comprises another series of fasteners constituting a mounting system interposed between the rigid structure and the wing of the aircraft, this system being normally composed of two or three fasteners.

Moreover, the pylon is provided with a plurality of secondary structures providing in particular the segregation and the maintaining of the systems while supporting elements of aerodynamic fairing, the latter generally taking the form of panels or fairings incorporated into these same structures. In a manner known by those skilled in the art, the secondary structures are differentiated from the rigid structure, also called primary structure, by the fact that they are not intended to provide the transfer of loads coming from the engine and which must be transmitted towards the wing of the aircraft.

Among the secondary structures, there is a front aerodynamic structure located to the front of the rigid structure of the attachment pylon, this front aerodynamic structure having not only an aerodynamic fairing function, but also allowing for the setting up, the segregation and the routing of the various systems (air, electric, hydraulic, fuel). In addition, this front aerodynamic structure carries the fan cowls of the associated engine, while the thrust reverser cowls are generally carried by the rigid structure of the attachment pylon.

In the solutions of prior art, the front aerodynamic structure generally comprises a cradle covered with an aerodynamic fairing, mounted fixedly on this latter. The aerodynamic fairing, also called a panel or element of aerodynamic fairing, thus covers the cradle, and as such fulfils the structural role of support for the fan cowls.

The aforementioned cradle is normally mounted on the rigid structure using a suitable means of hooking. However, when the engine unit is subjected to substantial stresses such as those encountered during the take-off and landing phases, or in flight during strong turbulence, the fixing of the cradle of the front aerodynamic structure to the rigid structure induces a substantial modification of the global geometry of the unit, and more specifically of that of the nacelle. In particular, it occurs that a misalignment can be observed between the air inlet of the nacelle accompanying the deformation of the engine, and the fan cowls mounted on said front aerodynamic structure fixed to the rigid structure of the attachment pylon, this front aerodynamic structure can as such also be separated from the same nacelle air inlet.

The phenomenon observed obviously caused the drag, which harms the overall performance of the aircraft.

Moreover, this solution consisting in connecting the cradle on the rigid structure of the attachment pylon causes its overhanging towards the front, which induces substantial mechanical stresses due to the associated mass.

In addition, it is indicated that an analogous phenomenon is also encountered when the cradle carrying fixedly the aerodynamic fairing is no longer mounted on the rigid structure of the attachment pylon, but exclusively on the fan case of the engine, fixed to the air inlet of the nacelle. In such a case, it occurs that a misalignment can be observed between the cradle aerodynamic fairing attached to the fan case, and the other aerodynamic fairings of the attachment pylon, and in particular the fairing located more towards the rear, called the connecting fairing.

In addition, when the cradle is mounted on the fan case of the engine, this normally causes difficulties in demonstrating the resistance of the front aerodynamic structure to the fan blade loss phenomenon, phenomenon also referred to as "Fan Blade Out", in that the front aerodynamic structure mounted fixedly on the fan case undergoes the same accelerations/displacements as the latter. In order to respond to these difficulties, it may as such be required to carry out van impact resistance tests with the cradle mounted on the fan case, this type of test is currently however not very well mastered.

On the other hand, with this technical solution for mounting, a fan blade loss can result in substantial risks of scooping between the front aerodynamic structure and the air inlet of the nacelle. Indeed, subsequent to the impact observed during a blade loss, a major displacement propagates in a few milliseconds on the fan case. All of the elements physically linked to this case are as such also displaced by the same value. The structures involved, such as the cradle of the front aerodynamic structure and the air inlet, must absorb these loads/major displacements, being moreover noted that substantial spaces are likely to be created between the air inlet and the cradle, and/or between the air inlet and a fan cowl. These same spaces, if they do not close back up, can increase in size very rapidly, and therefore cause the loss of the front aerodynamic structure, as well as that of the fan cowls.

Finally, still when the cradle is mounted on the fan case of the engine, it is generally required to provide the cradle with a system for adjusting, of which the purpose is to ensure spacing and misalignments that are in adequacy with the specifications. This system has the disadvantages of being costly as well as taking up much space.

SUMMARY OF THE INVENTION

The purpose of the invention is therefore to propose an engine unit for aircraft that overcomes the disadvantages mentioned hereinabove, concerning the realisations of prior art.

To do this, the invention has for object an engine unit for aircraft comprising an engine, a device for hooking the engine as well as a nacelle surrounding the engine and provided with fan cowls as well as an air inlet, this device for hooking comprising a rigid structure as well as a front aerodynamic structure, the latter having a cradle whereon the fan cowls are preferentially articulated and being covered with an aerodynamic fairing, the cradle of the front aerodynamic structure being provided with rear means of hooking mounted on the rigid structure of the device for hooking. According to the invention, the cradle of the front aerodynamic structure is in addition provided with front means of hooking mounted on the air inlet.

Consequently, the arrangement proposed makes it possible to greatly limit the harmful effects of misalignment described hereinabove, since the front portion of the cradle of the front aerodynamic structure carrying more preferably the fan cowls can now better accompany the displacements of the air inlet according to the deformations of the engine, during the periods of high stress on the unit.

As such, the flush junction between the air inlet of the nacelle and the fan cowls can be retained, which makes it possible to limit the losses of drag encountered with the realisations of prior art. In this respect, the losses of drag are also decreased by the retaining of the flush junction between the aerodynamic fairing and the other aerodynamic fairings of the attachment pylon, thanks to the presence of the rear means of hooking, likewise these losses of drag are also decreased by the retaining of the flush junction between the aerodynamic fairing and the air inlet, through the presence of the front means of hooking.

In addition, this particular arrangement makes it possible advantageously to limit the overhang towards the front encountered in prior art for the structural cradle carrying the fan cowls, since the latter is now provided with front means of hooking mounted on the air inlet of the nacelle.

On the other hand, as the cradle is more preferably no longer directly mounted on the fan case of the engine, and in any case mounted at its front and rear ends respectively on the attachment pylon and on the air inlet, there consequently no longer exists any difficulties in demonstrating the resistance of the front aerodynamic structure to the fan blade loss phenomenon. Indeed, it can be considered that the major displacement encountered by the fan case, subsequent to the loss of a vane, does not induce any substantial displacement on the cradle.

Moreover, even in the case of a loss of a fan blade, the front joint between the cradle and the air inlet implies that the risks of scooping between the front aerodynamic structure and the air inlet of the nacelle are strongly reduced, even reduced to nothing.

Finally, still due to the presence of the front joint between the cradle and the air inlet, the spaces required are greatly reduced, and in part are offset downstream, between the fairing of the cradle and the pylon, in a region that is less sensitive aerodynamically. Consequently, it is no longer advantageously required to provide the cradle with a system for adjusting, contrary to what was observed in prior art.

More preferably, the front means of hooking take the form of a front fastener designed in such a way as to absorb the loads that are exerted according to a longitudinal direction of the engine, according to a transversal direction of this same engine, and also according to a vertical direction of the latter.

Moreover, the rear means of hooking comprise more preferably two rear half-fasteners arranged on both sides of a front portion of the rigid structure of the device for hooking, each of the two rear half-fasteners being designed in such a way as to absorb the loads that are exerted according to a transversal direction of the engine and according to a vertical direction of the latter, and each authorising a limited relative displacement, according to a longitudinal direction of the engine, between a rear portion of the cradle of the front aerodynamic structure, and a front portion of the rigid structure.

In other words, each of the two rear half-fasteners takes the loads that are exerted according to the transversal and vertical directions, but not those that are exerted in the longitudinal direction according to which the small relative displacements between the rear portion of the front aerodynamic structure and the front portion of the rigid structure can as such be absorbed.

As such, the combination of the front fastener and of the two rear half-fasteners, constituting the set of means of hooking of the front aerodynamic structure, makes it possible to obtain means of hooking that are strongly advantageously close to an isostatic mounting system.

For the purposes of information, it is noted that in what precedes, the absorbing of loads that are exerted according to transversal and vertical directions of the engine, via the different fasteners, was mentioned. This applies particularly when the engine is intended to be mounted above the wing of the aircraft or suspended below the latter, and possibly also in the case of a mounting of the engine in the rear portion of the fuselage of the aircraft. Nevertheless, in this latter case, it may occur that the loads absorbed by the fasteners are no longer directed transversally and vertically in relation to engine as was mentioned hereinabove, but respectively directed according to a first direction of the engine orthogonal to the longitudinal direction, and according to a second direction of the engine orthogonal to the first direction and to the longitudinal direction, each of these first and second directions being then inclined in relation to the vertical and transversal directions of the engine. Naturally, the aforementioned inclination of the first and second directions of the engine is according to the geometry adopted for the engine unit, and to its positioning in relation to the rear portion of the fuselage, such as is well known to those skilled in the art.

More preferably, the two rear half-fasteners are arranged symmetrically in relation to a median plane of the unit, passing through a longitudinal axis of the engine. Here again, it is noted that the second direction defining this plane is given according to the configuration adopted. By way of an example provided for the purposes of information, when the engine is intended to be mounted above the wing of the aircraft or suspended below the latter, the second direction is generally the vertical direction of the engine.

In light of what precedes, it results therefore that the two rear half-fasteners each take more preferably the form of an annular linear joint, corresponding to the combination of a ball-connection joint and of a slide joint according to the longitudinal direction of the engine.

In this engine unit where the nacelle comprises conventionally an air inlet flush against the fan cowls, and located to the front in relation to the latter, it is preferentially provided that the aerodynamic fairing is mounted fixedly on the cradle carrying the aforementioned front and rear means of hooking. The aerodynamic fairing, more preferably solely fixed on its cradle, covers as such this latter, fulfilling a structural role of support for the fan cowls, since the unit further comprises preferentially a plurality of articulations of fan cowls of which at least some of them are fixed on this same cradle.

In this respect, it can for example be considered that the cradle fixedly carries three of the four articulations associated with each fan cowl, the last one then being mounted on the attachment pylon. Alternatively, it would be possible to provide a single one of the four cowl articulations mounted on the cradle, with the three other articulations fixed on the pylon, and this so as to best limit the mass of the cradle, and therefore the loads to be absorbed by the air inlet. Naturally, without leaving the scope of the invention, other solutions can be considered for the arrangement of the articulations, possibly mounted floating for some of them, i.e. directly linking the right and left fan cowls of the engine unit.

Still in a preferential manner, it is arranged in such a way that a rear portion of the cradle is penetrated by a front portion of the rigid structure of the device for hooking.

Moreover, the device for hooking comprises more preferably a plurality of engine fasteners among which a front engine fastener fixed on the one hand to the rigid structure, and on the other hand to the fan case of the engine. In such a case, it is more preferably provided that the front engine fastener be located, in a longitudinal direction of the engine, between the front and rear means of hooking of the cradle of the front aerodynamic structure.

Preferentially, the cradle comprises spars and transversal structural elements, such as hoops, connected rigidly to the spars, these spars and transversal structural elements each being in contact with the aerodynamic fairing. In addition, the cradle comprises at least one load absorbing link rod exercising according to the longitudinal direction of the engine, articulated at its two ends on respectively a front end transversal structural element of the cradle, and a rear end transversal structural element of the cradle.

In this configuration where the link rod(s) as such fulfil a structural role in combination with the spars and the transversal elements, said at least one link rod comprises two link rods forming together a V opening towards the rear, i.e. in the direction of the attachment pylon.

As mentioned hereinabove, the cradle is more preferably devoid of a direct mechanical joint with the engine, its only means of hooking on the rest of the engine unit therefore being preferentially comprised of said front and rear means of hooking.

Finally, the invention also has for object an aircraft comprising at least one engine unit such as that described hereinabove, assembled on a wing or on a rear portion of the fuselage of this aircraft.

Other advantages and characteristics of the invention shall appear in the detailed non-restrictive description hereinbelow.

BRIEF DESCRIPTION OF THE DRAWINGS

This description will be given with regards to the annexed drawings including.

DETAILED DESCRIPTION OF PREFERRED EMBODIMENTS

Figure 1:
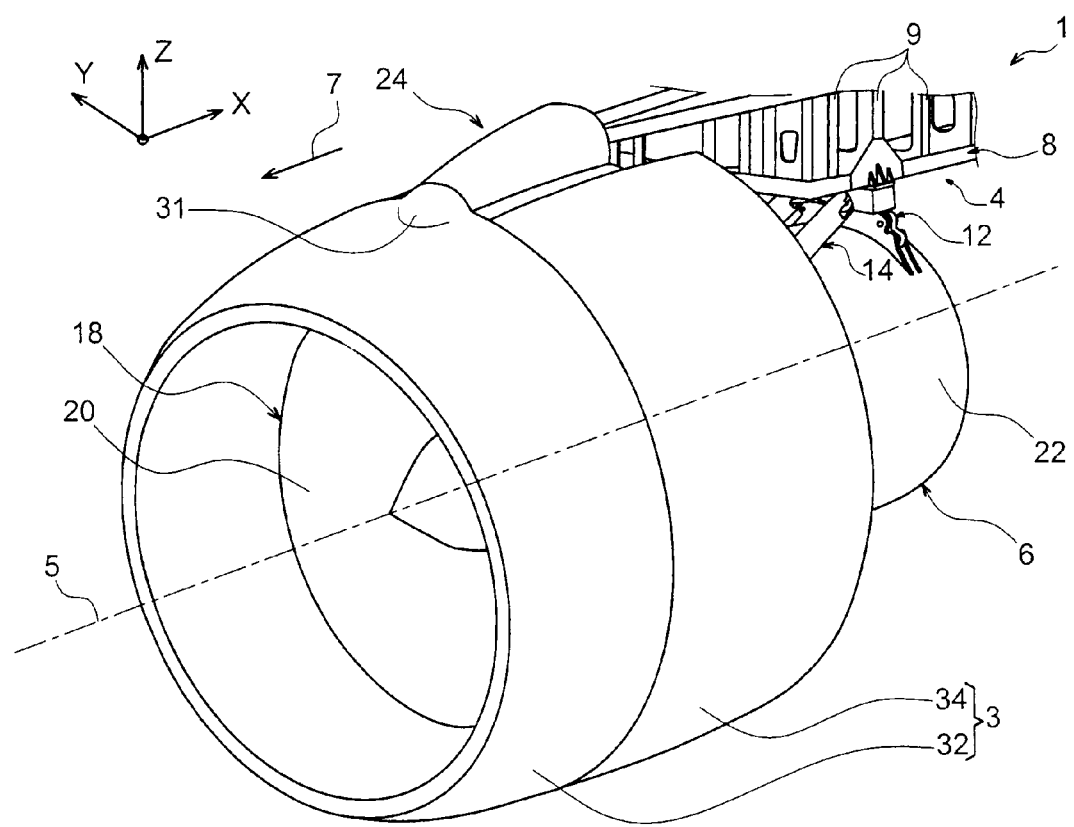
FIG. 1 shows a partial perspective view of an engine unit for aircraft, according to a preferred embodiment of this invention.
Figure 2:
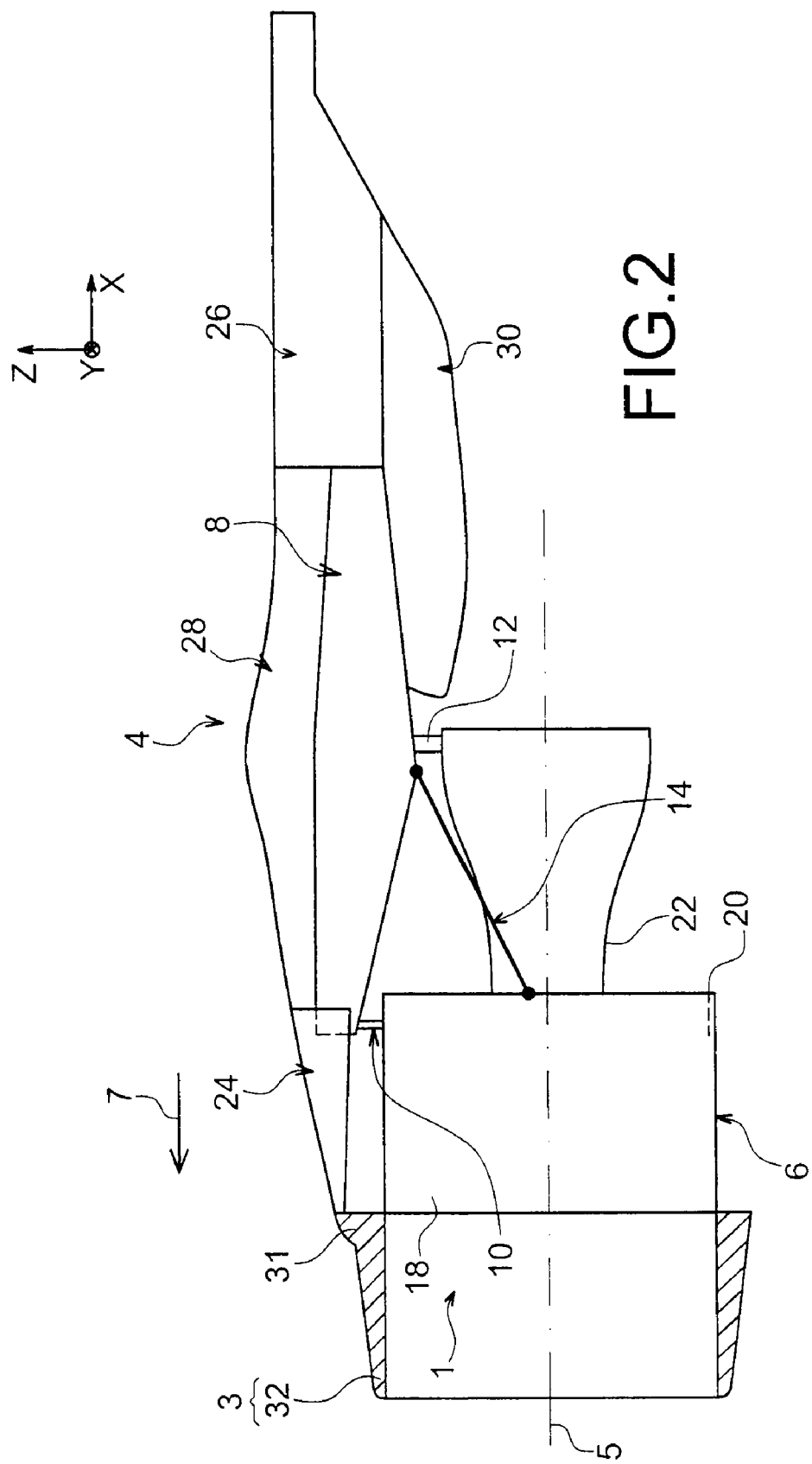
FIG. 2 shows a partial diagrammatical side view of the engine unit shown in FIG. 1.

In reference first of all to FIGS. 1 and 2, an engine unit 1 for aircraft is shown intended to be fixed under a wing of this aircraft (not shown), this unit 1 comprising a device for hooking 4, an engine 6 such as a jet engine fastened under this device 4, and a nacelle 3 of which only the front portion has been shown in FIG. 1.

In all the description which shall follow, by convention, X shall refer to the longitudinal direction of the device 4 which is also similar to the longitudinal direction of the jet engine 6, this direction X being parallel to a longitudinal axis 5 of this jet engine 6. On the other hand, Y refers to the direction directed transversally in relation to device 4 and also similar to the transversal direction of the jet engine 6, and Z the vertical direction or of the height, these three directions X, Y and Z being orthogonal to each other.

On the other hand, the terms "front" and "rear" are to be considered in relation to a forward direction of the aircraft encountered subsequent to the thrust exerted by the jet engine 6, this direction being shown diagrammatically by the arrow 7.

Globally, the device for hooking 4 comprises a rigid structure 8, also called a primary structure, carrying means of hooking of the engine 6, these means of hooking having a plurality of engine fasteners 10, 12, as well as a device for absorbing thrust loads 14 generated by the engine 6.

For the purposes of information, it is noted that the device for hooking 4 comprises another series of fasteners (not shown) added on the rigid structure 8 and making it possible to ensure the suspension of this unit 1 under the wing of the aircraft.

In addition, the device for hooking 4 comprises a plurality of secondary structures added on the rigid structure 8. These secondary structures ensuring the segregation and the maintaining of the systems while supporting the elements of aerodynamic fairing shall be described hereinafter.

It is indicated that the jet engine 6 has at the front a fan case 18 of large dimension delimiting an annular fan channel 20, and comprises towards the rear a central case 22 of smaller dimension, enclosing the core of this jet engine. The cases 18 and 22 are of course fastened together, and have a junction normally referred to as an intermediary case. Finally, it is specified that the central case 22 is extended towards the rear by a so-called ejection case (not referenced).

As can be seen clearly in FIG. 1, the engine fasteners 10, 12 of the device 4 are provided in the number of two, and respectively referred to as the front engine fastener and the rear engine fastener. The front engine fastener 10 is preferentially interposed between a front portion of the rigid structure 8, and an upper portion of the fan case 18, also called the radial end portion. This front engine fastener 10 is designed in a conventional manner and is known to those skilled in the art, for example provided to absorb the loads produced in the three directions X, Y and Z.

On the other hand, the rear engine fastener 12, also made in a conventional manner and known to those skilled in the art and which can be designed in order to absorb the loads produced in the directions Y and Z, is interposed between a more rear portion of the rigid structure 8, and the central case 22 or the ejection case.

The device 14 for absorbing the thrust loads generated by the engine can have a conventional form of double link rods each arranged on one side of the engine 6, the front end of each link rod being mounted on a rear portion of the fan case or of the intermediary case, and the rear end being added on the rear engine fastener 12 or on the rigid structure 8 in the vicinity of the latter.

In this preferred embodiment of this invention, the rigid structure 8 takes the form of a caisson extending from the front towards the rear, substantially according to the direction X.

The caisson 8 as best shown in FIG. 1 then takes the form of a pylon of design that is similar to that normally observed for attachment pylons of jet engines, in particular in the sense that it is provided with transversal ribs 9 each taking the form of a rectangle directed in a plane YZ.

In reference more specifically to FIG. 2, among the secondary structures of the pylon 4 are a front aerodynamic structure 24, a rear aerodynamic structure 26, a connecting fairing 28 of the front and rear aerodynamic structures, and a rear lower aerodynamic fairing 30.

Globally, these secondary structures are conventional elements that are identical or similar to those encountered in prior art, and known to those skilled in the art, except for the front aerodynamic structure 24 which shall be described in detail hereinafter.

More precisely, the front aerodynamic structure 24, which is the only one to have been shown in FIG. 1 for reasons of clarity, is normally placed at the front of the wing and slightly raised in relation to the primary structure 8 to which it is fixed. It has an aerodynamic profile function between an upper portion of the fan cowls articulated on the latter, and the leading edge of the wing. This front aerodynamic structure 24 thus has not only a function of supporting the fan cowls and of aerodynamic fairing, but also makes possible the setting up, the segregation and the routing of various systems (air, electric, hydraulic, fuel).

Directly in the read extension of this structure 24, mounted above the rigid structure 8, is located the connecting fairing 28, also called the "karman". Then, still towards the rear, the connecting fairing 28 is extended by the rear aerodynamic structure 26, which contains the major portion of the hydraulic equipment. This structure 26 is more preferably located entirely in the rear in relation to the rigid structure 8, and is therefore fastened under the wing of the aircraft.

Finally, under the rigid structure 8 and the rear aerodynamic structure 26, is located the rear lower aerodynamic fairing 30, also called "shield" or "Aft Pylon Fairing". Its main functions are the formation of a fire-proof barrier, and the formation of an aerodynamic continuity between the output of the engine and the attachment pylon.

Now in reference more specifically to FIG. 1, a portion of the nacelle 3 can be seen comprising on its front end an air inlet 32 fixed to the front of the fan case 18, this air inlet 32 being directly followed towards the rear by two fan cowls 34 (a single one is visible due to the perspective view) each mounted articulated on the secondary aerodynamic structure 24 discussed hereinabove. Although this has not been shown, it must be understood that the nacelle 3 of conventional design comprises towards the rear other elements known to those skilled in the art, such as thrust reverser cowls mounted on the rigid structure 8.

In addition, the air inlet 32 has on its upper rear portion an aerodynamic protuberance 31 located in the front extension of the front aerodynamic structure 24 of the pylon. Naturally, it is sought to obtain the best aerodynamic continuity possible between the aforementioned joining elements 31 and 24, which extend substantially according to the direction X on an upper portion of the engine unit 1. It is in this respect noted that a solution without protuberance 31 could be adopted, without leaving the scope of the invention.

Figure 3:
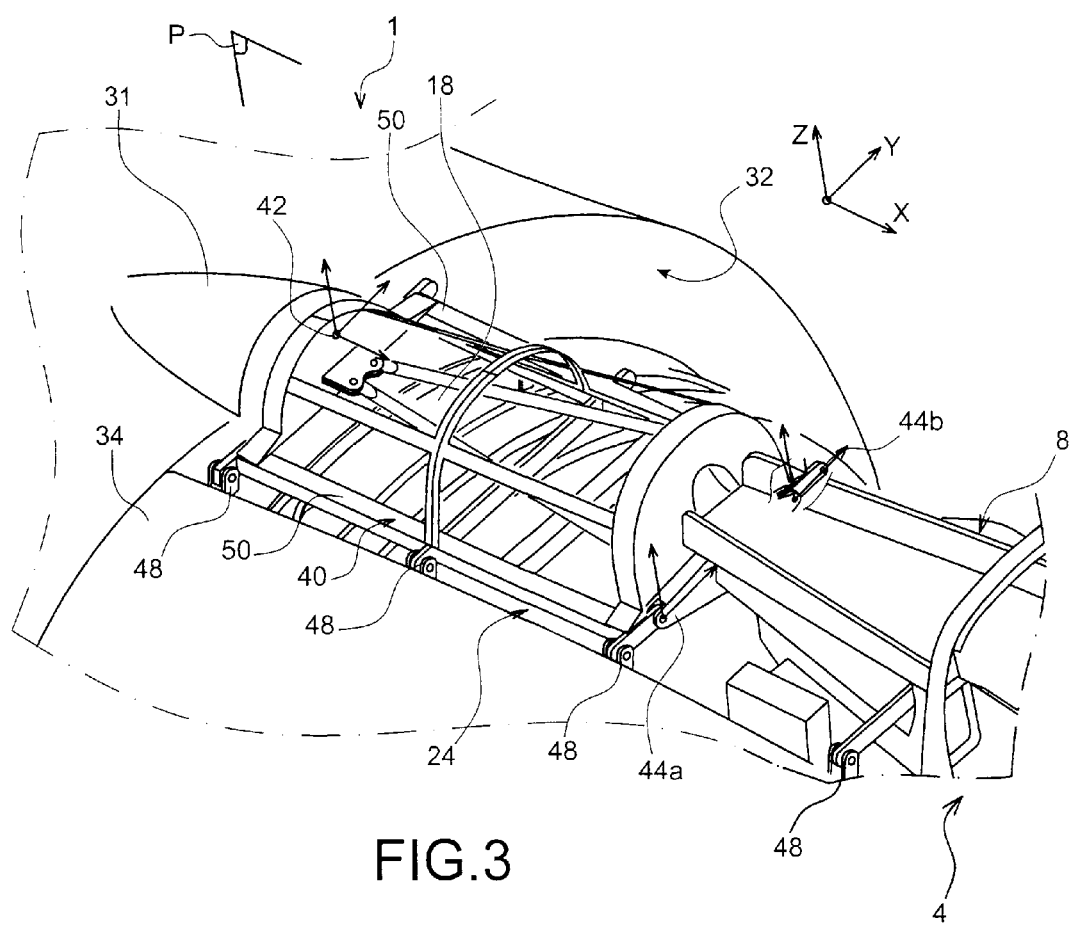
FIGS. 3 and 4 show partial and detailed views in perspective, taken from two different angles, of the engine unit shown in FIG. 1.
Figure 4:
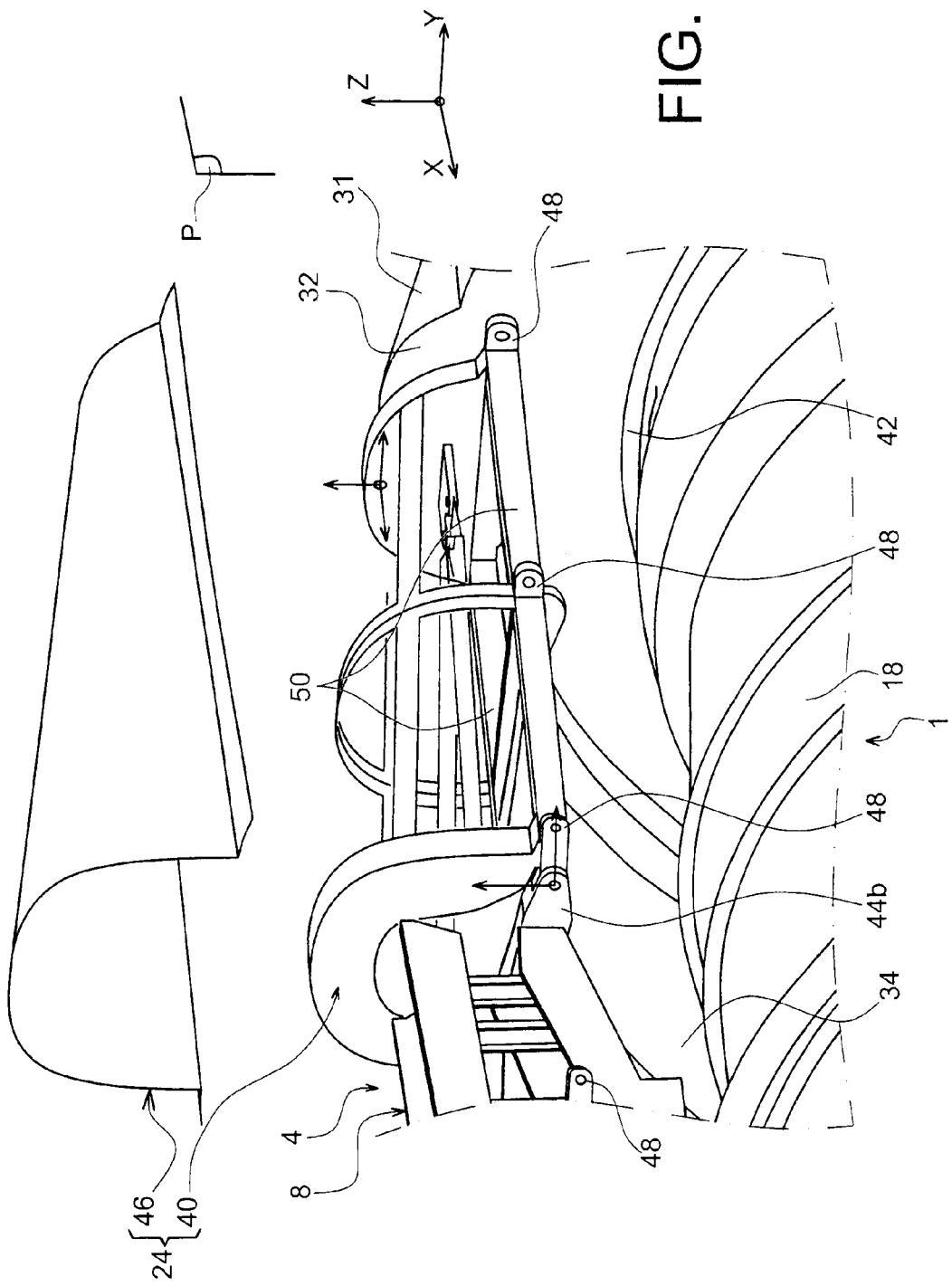

Reference shall now be made together to FIGS. 3 and 4, detailing in particular the front aerodynamic structure 24 incorporating one of the particularities of this invention.

The front aerodynamic structure 24 has a cradle 40 constituting the structural portion of this element. It extends globally above the fan case 18, and is comprised in a conventional manner known to those skilled in the art, i.e. by the assembly of spars extending substantially according to the direction X and transversal structural elements, of the hoop type opening downwards, for example of a substantially semi-cylindrical form as can be seen clearly in FIGS. 3 and 4.

In these same figures, it can furthermore be seen that the front portion of the rigid structure 8 of the attachment pylon 4 penetrates into the interior of this cradle by crossing at least the first hoop of this same cradle. Moreover, since the aforementioned front engine fastener 10 is mounted on a front end of the rigid structure 8, this implies that this front fastener 10 is in part located within an inside space delimited by the hoops of the cradle. In this respect, it is noted that in the FIGS. 3 and 4, the lower portion of the fastener 10 intended to be added on the fan case 18, has not been shown for reasons of clarity.

In order to provide for the mounting of the cradle 40 on the engine unit 1, front means of hooking as well as rear means of hooking are provided, such as shall now be described.

With regards to the front means of hooking, the latter generally take the form of a front fastener 42 added on a front end of the cradle 40. One of the particularities of the invention resides in the fact that this front fastener 42 is not only fastened to the cradle 40, but also to the air inlet 32, and more preferentially to its aerodynamic protuberance 31. Nevertheless, this protuberance 31 could be a part of the structure 24 and be added fixedly on the air inlet by the fastener 42, without leaving the scope of the invention.

More precisely, the front fastener 42 shown only diagrammatically in the FIGS. 3 and 4 is therefore mounted on the protuberance 31 and on an upper radial end of the hoop of the most frontal cradle. It is more preferably designed in such a way as to absorb the loads produced in according to each of the directions X, Y and Z of the engine, such as is diagrammed by the arrows in FIGS. 3 and 4. For the purposes of information, this engine fastener can be designed conventionally using brackets and axes, such as is well known by those skilled in the art. In particular, it can take the form of a ball-connection mounted in such a way that it is able to absorb the loads produced according to the three directions.

On the other hand, the rear means of hooking take more preferably the form of two rear half-fasteners arranged on both sides of a front portion of the rigid structure 8. As can be seen in FIGS. 3 and 4, these two half-fasteners 44a, 44b are more preferably located to the rear in relation to the front engine fastener 10, in such a way that the latter is therefore placed, in the direction X, between the front means of hooking and the rear means of hooking of the front aerodynamic structure 24. Each of the two rear half-fasteners 44a, 44b is more preferably designed in such a way as to absorb the loads that are exerted according to the directions Y and Z, but not those that are exerted according to the direction X. Here again, they are designed in a conventional manner and known to those skilled in the art, using axes and brackets. For the purposes of information, it is noted that each half-fastener can include a bracket extending according to the direction Y and having on its end opposite that added on the rigid structure 8, a clevis crossed by an axis cooperating also with a bracket housed in said clevis and added on the cradle 40. In addition, each of these two rear half-fasteners 44*a*, 44*b* is then designed in such a way as to authorise a limited relative displacement, according to the direction X, between the rear portion of the aerodynamic structure 24 and the front portion of the rigid structure 8 of the pylon. It is indicated that if the front means of hooking are added on the most frontal hoop of the cradle 40, the two rear half-fasteners 44*a*, 44*b* are added on the hoop of the cradle 40 that is furthest to the rear, as can be seen clearly in FIGS. 3 and 4. On the other hand, these two half-fasteners are arranged symmetrically by a vertical median plane P passing through the longitudinal axis 5 of the engine, this plane P globally constituting a plane of symmetry for the engine unit intended to be added under the wing of the aircraft.

In addition, it is noted that each of the two rear half-fasteners 44*a*, 44*b* can be carried out in the form of an annular linear joint, corresponding to the combination of a ball-connection joint more preferably arranged between the aforementioned bracket and axis of the half-fastener, and of a slide joint according to the longitudinal direction of the engine, i.e. according to the direction of this same axis.

The cradle 40, covered conventionally by an aerodynamic fairing 46 more preferably solely fixed on this same cradle 40 and on no other element of the unit, is provided with a plurality of articulations of fan cowls 34, these articulations being more preferably arranged on each of the two lateral spars of the cradle, arranged on either side of the plane P. Each of these two spars 50 thus carries a plurality of articulations 48 connected to one of the fan cowls 34 of the nacelle, these articulations 48 carried by each spar 50 able to constitute all or a portion of the means of hooking of a given fan cowl. In the example shown in FIGS. 3 and 4, the articulations 48 provided on a given spar 50, for example provided in the number of three, are associated to a fourth articulation 48 located in the extension of the other three, towards the rear of the latter, this fourth articulation 48 being effectively added solidly on the front portion of the rigid structure 8, at the rear of the rear means of hooking of the aerodynamic structure 24. Naturally, for each of the two fan cowls 34, the articulations 48 provided on the cradle 40 and the articulation or articulations 48 located at the rear on the rigid structure 8, are provided to be arranged according to the same axis of articulation of the cowl 34.

Alternatively, it would have been for example possible to fix three articulations 48 on the rigid structure, and a single on the cradle, or yet possible to adopt any other configuration, with possibly one or several articulations mounted floating, free of any fastener, without leaving the scope of the invention.

Figure 5:
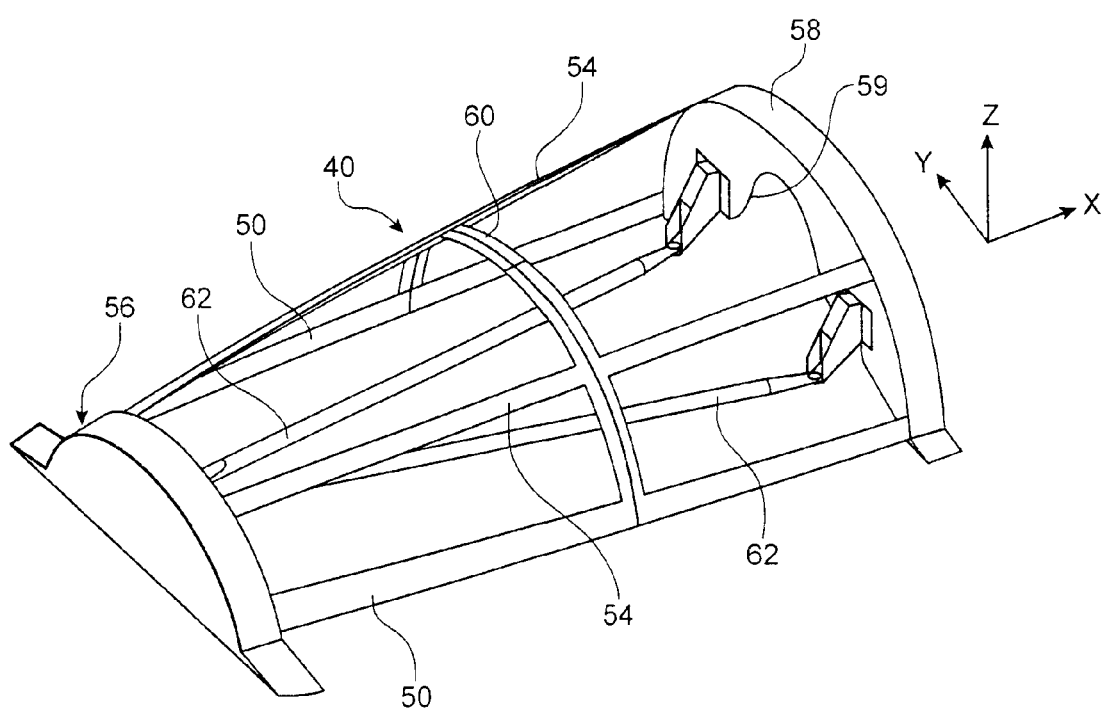
FIG. 5 shows a partial perspective view of a cradle of support of fan cowls for engine unit, according to another preferred embodiment of this invention.
Figure 6:
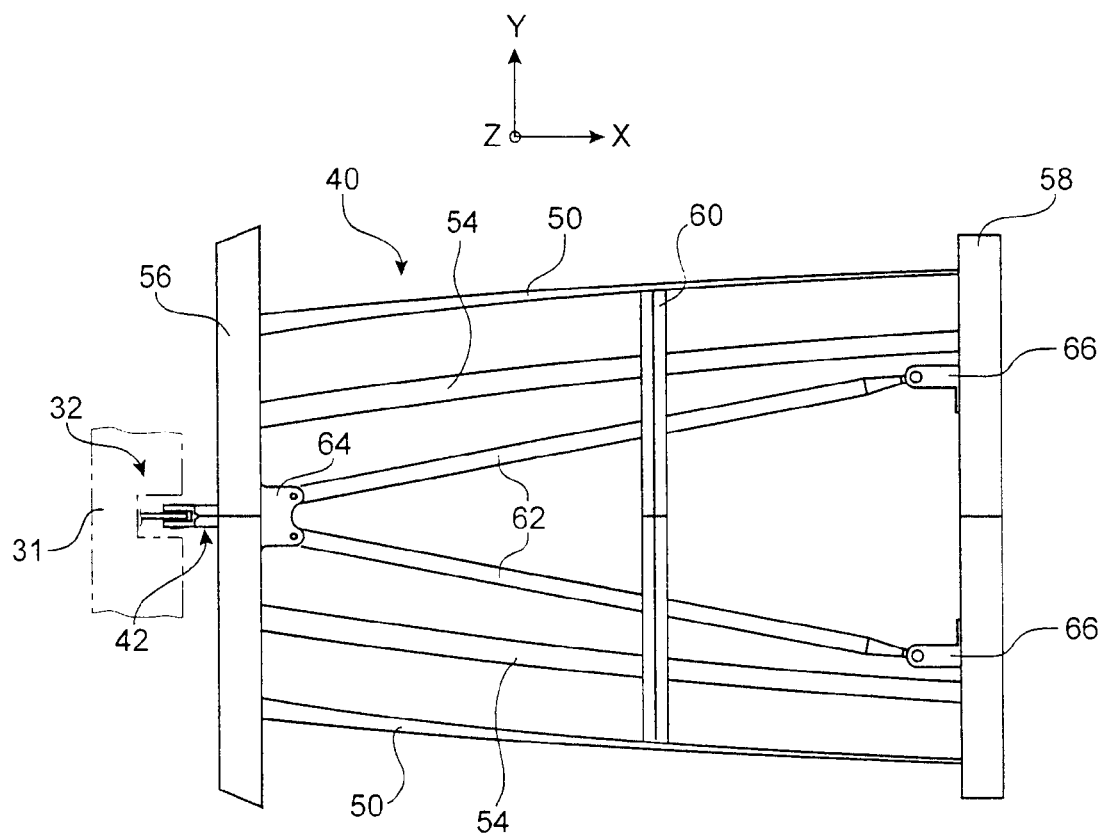
FIG. 6 shows a top view of the cradle shown in FIG. 5.
Figure 7:
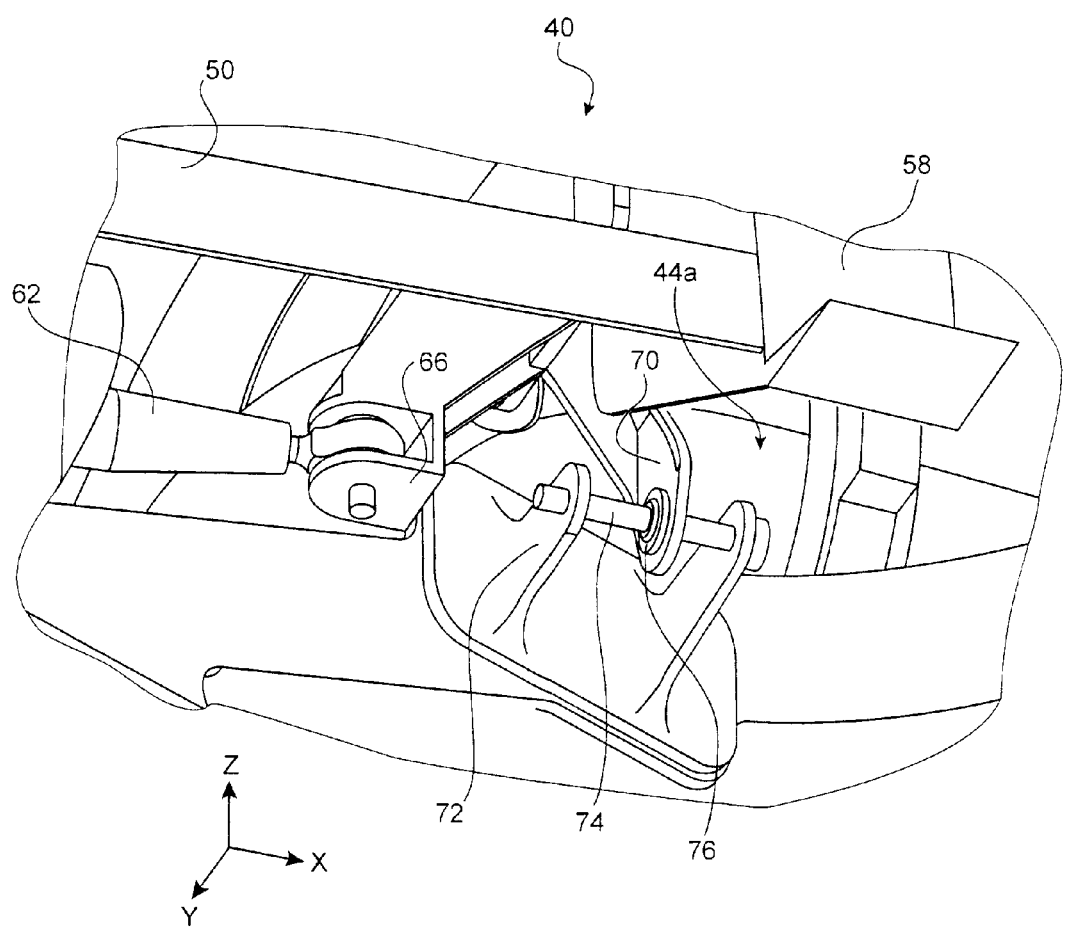
FIG. 7 shows a perspective view of a rear lower portion of the cradle shown in FIGS. 5 and 6.

Now in reference to FIGS. 5 to 7, a cradle 40 can be seen having the form of another preferred embodiment of this invention. As such, it is to be understood that the cradle 40 which shall now be described has a function that is identical to that which has just been exposed.

As is best seen in FIGS. 5 and 6, the cradle 40 has two lateral spars 50 extending from one end to the other of the length of the cradle, and having a function of support of the articulations of fan cowls (not shown). Moreover, the cradle 40 further comprises two other spars 54 located viewed from above between the two spars 50 and extending also from one end to the other of the length of the cradle 40. In addition, it is noted that these four spars 50, 54 are mounted rigidly, by joints of the embedding type, to transversal structural elements among which are a front end transversal structural element taking the form of a solid rib 56 intended to carry the front fastener 42, a rear end transversal structural element 58 having a cut-out 59 authorising the passage of the front portion of the rigid structure of the attachment pylon, and finally an intermediary structural element of the hoop type 60, open downwards.

As such, all of the aforementioned elements, i.e. the spars 50, 54 and the transversal structural elements 56, 58, 60 constitute a surface of support for the aerodynamic fairing 46 (not shown), the latter being effectively intended to contact each of the aforementioned structural elements.

Moreover, with the purpose of providing a satisfactory transmission of the loads according to the direction X from the front towards the rear of the cradle 40, it is provided, in addition to the aerodynamic fairing support structure, load absorbing link rods 62 extending also more preferably substantially from one end to the other of the length of the cradle. Nevertheless, these link rods 62 are not required, in particular when the spars 50 are designed to support the fan cowls, as described above. They can however become useful when the spars 50 are only dimensioned to support the fairing 46, not the fan cowls, a case which is effectively encountered when the cradle of the front aerodynamic structure 24 does not have for function to support these cowls, which are then articulated on the attachment pylon.

More precisely, in reference to the FIG. 6, two link rods 62 are provided of which the front end of each of them is connected in an articulated manner to the front end transversal structural element 56, by the intermediary of an embedded bracket 64. Moreover, the rear end of each of the link rods 62 is articulated on a bracket 66 fastened to the rear end transversal structural element 58. As can be seen in FIG. 7, it can be seen that each bracket 66 can in reality take the form of a clevis wherein is introduced the rear end of the link rods 62, the articulation provided being located more preferably according to the direction Z, as is also the case for the articulation of the front ends of the link rods 62.

Again in reference to the FIG. 6, it can be seen that the two link rods 62 for absorbing the loads that are exerted according to the direction X form together a V opening towards the rear, the tip of the V being as such located on the embedded connecting bracket 64. Finally, it is indicated that in a top view, the two link rods 62 are arranged symmetrically in relation to the aforementioned plane P, and also arranged between the two spars 50, and further preferentially between the two upper spars 54.

In FIG. 7, the rear half-fastener 44*a* has been represented in detail. As mentioned hereinabove, the latter includes a bracket 70 housed between the two heads of a clevis 72, the connection between these two elements 70, 72 being carried out using a slide rail axis 74 directed according to the direction X. The slide rail axis 74 carries a ball-connection 76 of which the outer ring is housed fixedly in an orifice of the bracket 70 fastened to the cradle 40, and more precisely to the rear end transversal structural element 58. As such, this design shows well the carrying out of an annular linear joint, in that it entails here a combination of a ball-connection joint 76, and a slide joint 74 directed according to the direction X. In this regard, it is noted that the difference with the rear half-fastener 44*a* shown in FIG. 3 resides in the separation of the heads from the clevis 72, which is greater than that shown in FIG. 3. As such, the limitation of the displacement of the cradle 40 according to the direction X in relation to the primary structure of the attachment pylon is then less substantial that that encountered in the preferred embodiment shown in FIG. 3. Naturally, it is understood that the axis 74 is mounted fixedly and rigidly on the clevis 72, the desired slide joint being obtained by the sliding of the lower ring of the ball-connection 76 on this same axis 74.

Of course, diverse modifications can be made by those skilled in the art to the invention which has just been described, solely by way of a non-restricted example. In this respect, it can in particular be noted that if the engine unit 1 has been presented in a configuration adapted so that it is suspended under the wing of the aircraft, this unit 1 could also be presented in a different configuration allowing it to be mounted above this same wing, even on a rear portion of the fuselage of this aircraft.

The invention claimed is:

1. An engine unit for an aircraft comprising:
an engine;
a device for hooking the engine to said aircraft;
a nacelle surrounding the engine and including fan cowls and an air inlet,
the device for hooking comprising a rigid structure and a front aerodynamic structure, the front aerodynamic structure including a cradle covered with an aerodynamic fairing, the cradle including rear means of hooking mounted on the rigid structure of the device for hooking, and the cradle including front means of hooking mounted on the air inlet and configured to fasten said air inlet of said nacelle to said cradle of said device for hooking,
wherein the air inlet is flush against the fan cowls, and is located frontward in relation to the fan cowls, and
wherein the fan cowls are articulated around the cradle, the cradle carrying the front and rear means of hooking.

2. An engine unit according to claim 1, wherein the front means of hooking includes a front fastener configured to absorb loads that are exerted according to a longitudinal direction of the engine, according to a transversal direction of the engine, and according to a vertical direction of the engine.

3. An engine unit according to claim 1, wherein the rear means of hooking comprises two rear half-fasteners arranged on either side of a front portion of the rigid structure of the device for hooking, each of the two rear half-fasteners configured to absorb loads that are exerted according to a transversal direction of the engine and according to a vertical direction of the engine, and authorizing each one a limited relative displacement, according to a longitudinal direction of the engine, between a rear portion of the cradle of the front aerodynamic structure and a front portion of the rigid structure.

4. An engine unit according to claim 3, wherein the two rear half-fasteners are arranged symmetrically in relation to a median plane of the unit, passing through a longitudinal axis of the engine.

5. An engine unit according to claim 3, wherein the two rear half-fasteners each take a form of an annular linear joint.

6. An engine unit according to claim 1, wherein a rear portion of the cradle is penetrated by a front portion of the rigid structure of the device for hooking.

7. An engine unit according to claim 1, comprising a plurality of articulations of fan cowls, with at least some of the articulations being fixed on the cradle.

8. An engine unit according to claim 1, wherein the device for hooking further comprises a plurality of engine fasteners, including a front engine fastener fixed on the rigid structure, and fixed to a fan case of the engine.

9. An engine unit according to claim 8, wherein the front engine fastener is located, in a longitudinal direction of the engine, between the front and rear means of hooking of the cradle of the front aerodynamic structure.

10. An engine unit according to claim 1, wherein the cradle comprises spars and transversal structural elements connected rigidly to the spars, the spars and transversal structural elements each being in contact with the aerodynamic fairing, and wherein the cradle further comprises at least one link rod for absorbing loads that are exerted in a longitudinal direction of the engine, articulated at its two ends on respectively a front end transversal structural element of the cradle, and a rear end transversal structural element of the cradle.

11. An engine unit according to claim 10, wherein the at least one link rod comprises two link rods forming together a V opening towards the rear.

12. An engine unit according to claim 1, wherein the cradle is devoid of direct mechanical joint with the engine.

13. An aircraft comprising at least one engine unit according to claim 1, assembled on a wing or on a rear portion of a fuselage of the aircraft.

14. An engine unit according to claim 1, wherein a rear portion of said air inlet defines an aerodynamic protuberance, and wherein said front means of hooking is fastened to said aerodynamic protuberance.

* * * * *

UNITED STATES PATENT AND TRADEMARK OFFICE
CERTIFICATE OF CORRECTION

| | | |
|---|---|---|
| PATENT NO. | : 8,382,031 B2 | Page 1 of 1 |
| APPLICATION NO. | : 12/674796 | |
| DATED | : February 26, 2013 | |
| INVENTOR(S) | : Loic Dussol et al. | |

It is certified that error appears in the above-identified patent and that said Letters Patent is hereby corrected as shown below:

On the title page, Item (73), the Assignee's information is incorrect. Item (73) should read:

--(73) Assignee: AIRBUS OPERATIONS, (incorporated as a Societe par Actions Simplifiee), Toulouse (FR)--

Signed and Sealed this
Twenty-eighth Day of May, 2013

Teresa Stanek Rea
*Acting Director of the United States Patent and Trademark Office*